Jan. 20, 1959  D. A. KIFFER ET AL  2,869,839
POWER PLANT ARRANGEMENT FOR MOBILE SPRAY TANK
Filed July 17, 1956  3 Sheets-Sheet 1
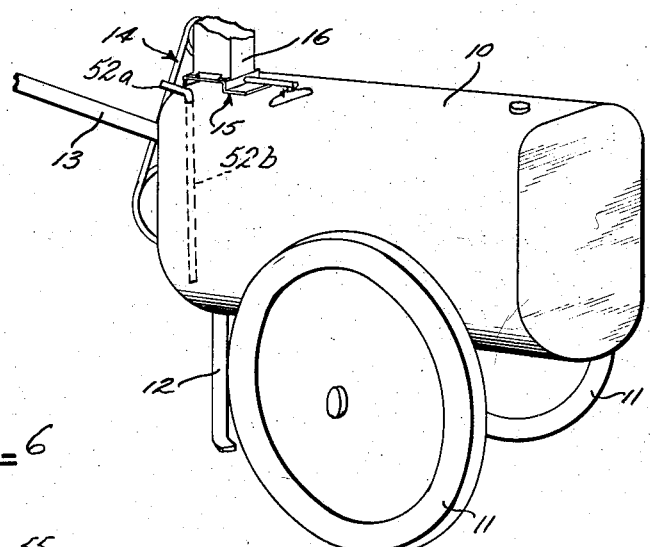
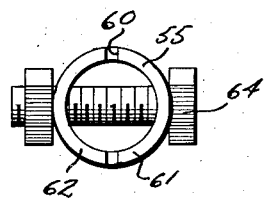
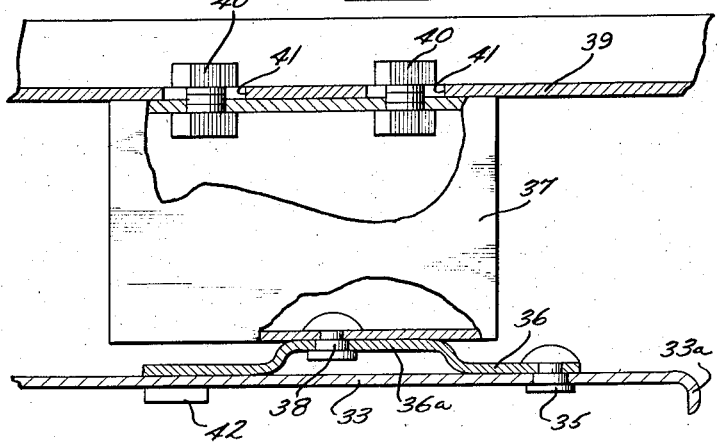
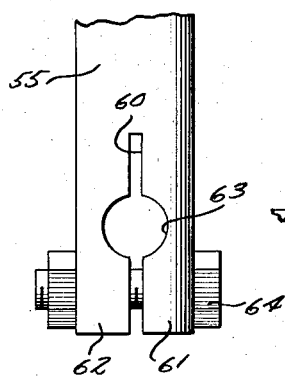
Inventors
DESIRE A. KIFFER
LAWRENCE D. ORSER

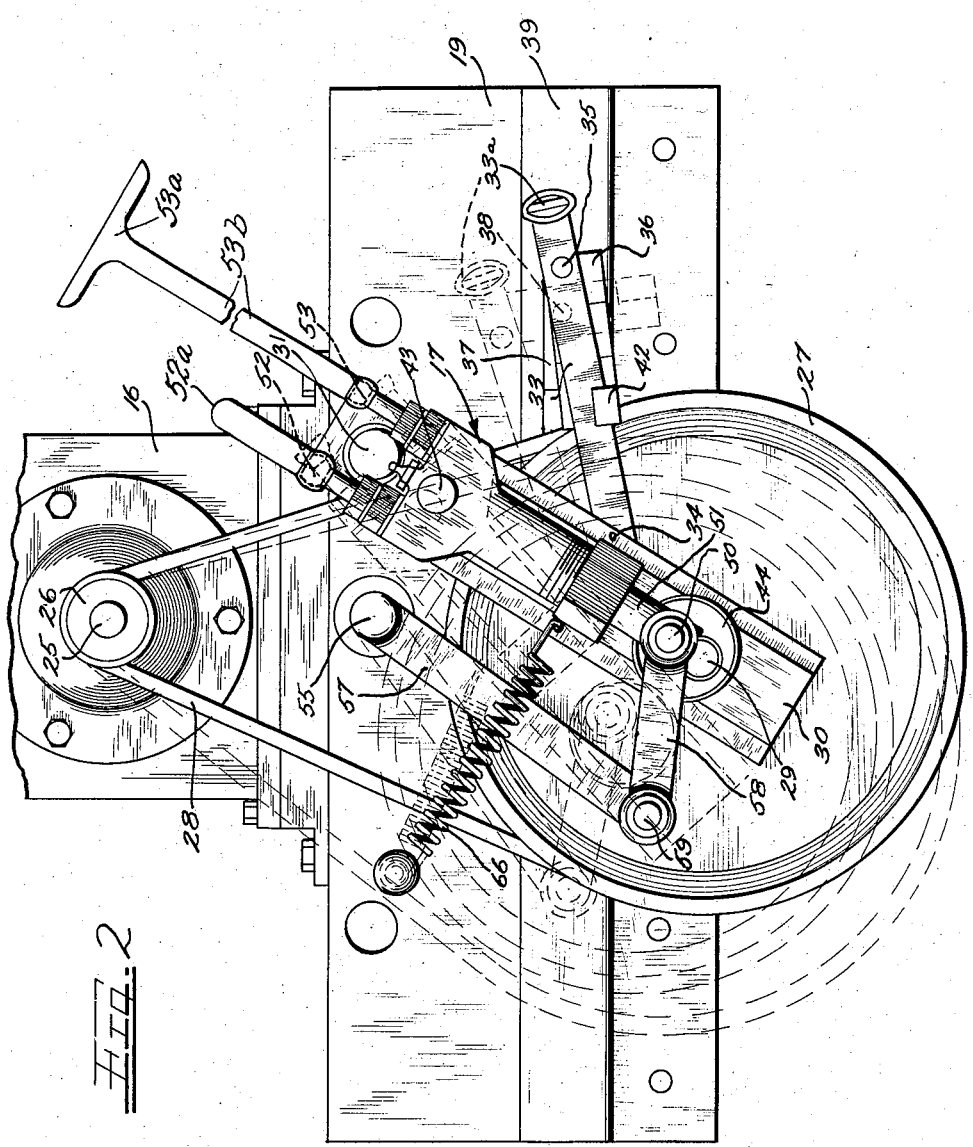

Jan. 20, 1959     D. A. KIFFER ET AL     2,869,839
POWER PLANT ARRANGEMENT FOR MOBILE SPRAY TANK
Filed July 17, 1956     3 Sheets-Sheet 3

Inventors
DESIRE A. KIFFER
LAWRENCE D. ORSER

United States Patent Office 2,869,839
Patented Jan. 20, 1959

2,869,839

POWER PLANT ARRANGEMENT FOR MOBILE SPRAY TANK

Desire A. Kiffer, Waterloo, and Lawrence D. Orser, Cedar Falls, Iowa, assignors to Chamberlain Corporation, Waterloo, Iowa, a corporation of Iowa Application July 17, 1956, Serial No. 598,423

8 Claims. (Cl. 259—39)

This invention relates to improvements in power spraying apparatus, and more patricularly to a mobile spraying unit equipped with a power plant arrangement having a combination pumping and agitating mechanism operable from a single prime mover. Although the pumping and agitation unit of the present invention is particularly adapted for use with spraying equipment, it should be understood that it may be utilized wherever a pumping function or a pumping and agitating function is desired.

Heretofore, mobile spraying equipment included a spray tank having the pump and motor mounted on top of the tank, and the operator generally followed behind the tank when it was moving, whereby actuation and operation of the pump and engine was inconvenient and time consuming. Moreover, the overall appearance of this type of unit, with the pump mounted on top of the tank, was not altogether pleasing.

In the present invention, the engine and pump assembly is mounted on a single bracket with the engine positioned on top of the spray tank and the pump positioned at the side or rear end of the spray tank. A unique de-clutching arrangement is provided for drivingly disconnecting the engine and pump when desired. Moreover, an agitator is provided which is driven from the pump shaft to agitate the liquid in the spray tank.

Accordingly, it is an object of this invention to provide an improved mobile spraying apparatus.

Another object of this invention resides in the provision of a mobile spray tank equipped with a pump and engine assembly, wherein operation of the pump may be controlled by a unique de-clutching arrangement without stopping the engine.

A still further object of this invention is to provide in a mobile spraying apparatus an engine and pump assembly mounted on a single bracket which fits on the spray tank, wherein the engine rests on top of the tank, while the pump is positioned along the side or back of the tank in a more convenient position for the operator.

A further object of this invention resides in the provision of a combination pumping and agitation assembly for use on mobile spray tanks.

A still further object of this invention is in the provision of a mobile spray tank equipped with an engine and pump assembly and an agitator driven from the pump shaft for keeping the liquid in the spray tank in a mixed condition.

Other objects, features, and advantages of the invention will be apparent from the following detailed disclosure, taken in conjunction with the accompanying sheets of drawings, wherein like reference numerals refer to like parts, and in which:

On the drawings:

Figure 1 is a partially fragmentary perspective view of a mobile spraying unit equipped with means embodying principles of the present invention;

Figure 2 is an enlarged elevational view, partly fragmentary, of the pump and engine assembly in accordance with the present invention as mounted on its mounting plate, and showing in phantom view the position of the pump and its parts when it is de-clutched from the engine;

Figure 4 is a fragmentary top plan view of a detailed portion of the de-clutching actuating mechanism, with some parts broken away and other parts shown in section;

Figure 5 is a fragmentary plan view of the actuating shaft to which the agitator is connected; and Figure 6 is an end elevational view of the shaft structure shown in Figure 5.

As shown in the drawings:

Figure 3:
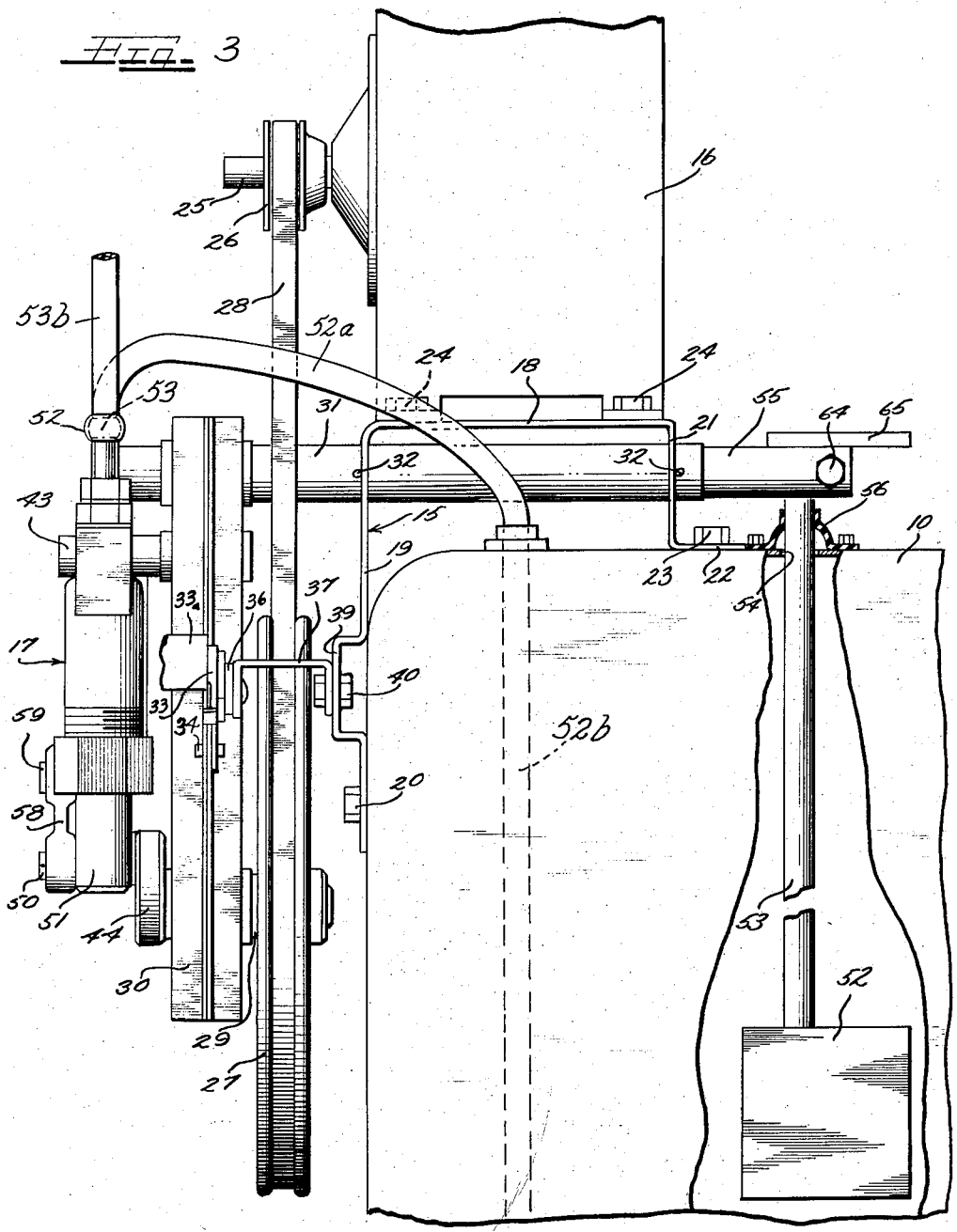
Figure 3 is a partially fragmentary end elevational view of a combination pumping and agitating assembly according to the instant invention, with some parts broken away for purposes of clarity, and showing the unit installed on a spray tank.

In Figure 1, a mobile spraying unit is illustrated as equipped with the present invention, and includes an elongated tank 10 for receiving the spraying liquid. An axle is carried on the bottom of the tank which rotatably mounts a pair of wheels 11—11 permitting the unit to be easily moved along the ground. In order to maintain the tank in a substantially level position when standing at one location, a standard 12 is provided which depends from the bottom of the tank 10 at one end thereof to rest on the ground. To facilitate handling of the spraying unit and maneuvering it from one place to another, a pair of handles 13 (only one shown) extend from the back wall of the tank for the operator, the unit generally being pushed from place to place.

The power plant arrangement, generally designated by the numeral 14 is mounted at the rear end of the tank 10 in a position convenient for operation by the operator. This arrangement includes generally an inverted substantially L-shaped mounting plate or bracket 15 having secured thereto an engine 16 and a pump assembly generally indicated by numeral 17. The bracket 15 comprises a horizontal leg 18 in overlying and spaced parallel relationship with the top of the tank 10, and a vertical leg 19 extending downwardly from the outer end of the horizontal leg and being in intimate engagement with the rear wall of the tank 10. A plurality of fasteners 20 secure the lower end of the vertical leg 19 to the rear wall of the tank 10. At the inner end of the horizontal leg 18, a flange 21 extends downwardly in parallel spaced relationship to the vertical leg 19, and is bent horizontally at its inner end to form a securing flange 22 in overlying relationship to the top of the tank 10. A plurality of fasteners 23 secure the flange 22 to the top of the tank. The engine or motor 16 is bolted to the top of the horizontal leg 18 by a plurality of nut and bolt assemblies 24. Preferably, the engine 16 will be an internal combustion engine, although an electric motor or any other suitable type of prime mover may be employed.

Referring now particularly to Figures 2 and 3, the engine 16 is provided with a drive shaft 25 having a pulley 26 secured thereto and positioned in overhanging relationship to the tank 10 and mounting bracket 15. A driven pulley 27 of much larger size than the drive pulley 26 is drivingly connected to the drive pulley by a belt 28. The driven pulley 27 is mounted on a shaft 29 for co-rotation therewith which, in turn, is bearingly carried on one end of a swingable supporting arm 30. The other end of the arm 30 is bearingly mounted at the outer end of a supporting member 31 in cantilever fashion and in spaced relationship from the vertical leg 19 of the mounting bracket 15. Aligned apertures or openings are formed in the vertical leg 19 and the opposing flange 21 for receiving the supporting member 31. Cross pins 32 extend transversely through the supporting member 31 and engage the outer faces of the vertical leg 19 and the opposing flange 21 to secure the supporting member 31 against axial movement relative to the mounting bracket 15. Inasmuch as the swinging arm 30 is bearingly mounted on the end of the supporting member 31, the latter may be secured against relative rotation with the mounting bracket 15 although this is not necessary. Alternately, the arm 30 and supporting member 31 may be rigidly connected together and the member 31 may be pivotally mounted with respect to the mounting bracket 15.

An over-center toggle mechanism is carried on the mounting bracket 15 which serves as a de-clutching means for the pulleys in that it is capable of swinging the driven pulley 27 carried on the arm 30 closer to the drive pulley 26 and release the tension of the belt 28. This toggle mechanism as seen in Figures 2, 3 and 4, includes a lever 33 riveted on one end to an intermediate portion of the swingable arm 30 at 34, and pivoted at its other end by a pin 35 to one end of a link 36. Spaced from the pin 35 along the link 36 is an offset portion 36a that is pivotally secured to an inverted U-shaped bracket 37 by a pin 38. The bracket 37 is detachably secured to longitudinally extending channel-shaped portion 39 formed in the vertical leg 19 by a pair of nut and bolt assemblies 40. To facilitate adjustment of the mounting bracket 37 longitudinally with respect to the mounting bracket 15 for adjusting the tensioning of the belt 28, slotted apertures 41 extend longitudinally in the mounting bracket channel-shaped portion 39, as seen most clearly in Figure 4. At the end of the actuating lever 33 opposite its pivot connection to the swinging arm 30, a handle portion 33a is formed which is grasped by the operator when operating the toggle mechanism to clutch and de-clutch the driven pulley 27. To limit the movement of the over-center toggle mechanism, and especially the movement of the lever 33 with the respect to the link 36, an abutment or stop 42 is provided on the link 36 to receive the lower edge of the lever 33 when it is in locked position.

The pump 17 is secured at its upper end to a longitudinally extending cantilever bar 43 which is bearingly mounted at one end to the swinging support arm 30. Thus, the pump 17 is pivotally mounted with respect to the arm 30. For actuating the pump 17, a crank disk 44 is eccentically mounted on the end of the drive shaft 29 and carries a crank pin 50 in diametrically opposed relationship to the shaft 29, the crank pin 50 extending through a piston 51 of the pump 17 in rotatable association therewith so that rotation of the drive shaft 29 reciprocates the pump piston 51. The pump is provided with an inlet 52 and an outlet 53, as seen in Figures 2 and 3. The inlet 52 is connected to the tank by a conduit 52a which joins with or is an integral part of an extension 52b leading to a point near the bottom of the tank, Figs. 1 and 3. The outlet 53 is connected to a spray nozzle 53a or equivalent discharge element by a conduit 53b as seen in Fig. 2.

In some cases, a stirring agitation of the liquid in the spray tank is desirable. An agitator assembly is provided for this purpose which is also driven by the pulley 27 and includes a paddle 52 secured on the end of a swingable arm 53 within the tank 10. The arm 53 extends through a transverse slot 54 formed in the top of the tank 10, and is connected to the inner end of a rockable shaft 55. To prevent splashing of the liquid upwardly through the slot 54, a flexible boot 56 is secured at one end around the slot 54 on the top of the tank 10 and sealingly engages the arm 53 at the other end. The rocking shaft 55 is pivotally carried in aligned apertures formed in the vertical leg 19 and opposed flange portion 21 of the mounting bracket 15, the outer end of the shaft extending beyond the pump supporting arm 30. Integrally connected with the outer end of the shaft 55 and extending downwardly is an arm 57, the lower free end of which is connected to a link 58 by a pivot pin 59. The link 58 is received on the outer end of the crank pin 50 and held thereon by any suitable means such as a cotter pin. Rotation of the crank disk 44 oscillates the paddle 52 through the crank pin 50, the link 58, the arm 57, the rockable shaft 55, and the paddle arm 53.

Referring now to Figures 3, 5 and 6 it is seen that variable agitation may be obtained by virtue of the connection between the paddle arm 53 and the rockable shaft 55. The shaft 55 is in the form of a tubular member having the end longitudinally slotted at 60, wherein the slot opens outwardly to allow flexing of split end portions 61 and 62. Opposed substantially half circle cutouts 63 are formed along the slot 60 at both sides of the shaft for receiving the upper end of the paddle arm 53. To lock the paddle arm relative to the shaft 55, a nut and bolt assembly 64 extends through the opposed portions 61 and 62 to draw them together and frictionally bind the paddle arm 53. Thus, to change the effective acting cross sectional area of the paddle 52 in the tank it is only necessary to loosen the nut and bolt assembly 64, grasp an indicator arm 65 attached to the top of the paddle arm 53 and at right angles thereto, and turn the arm in either direction. Then tightening of the bolt assembly 64 again locks the positioning of the paddle arm 53 with respect to the rocking shaft 55.

In the position shown in Figure 2 in solid lines, the over-center toggle mechanism holds the pump mounting arm 30 in a position to tension the belt 28 between the drive pulley 26 and the driven pulley 27. It is noted that the pump supporting arm 30 is angularly related with respect to the vertical with the lower end being swung upwardly from its bottom dead center position. The de-clutching of the driving pulley 27 is effected by raising of the toggle lever 33 from the position shown in solid lines to the position shown in dotted lines thereby swinging the top supporting arm 30 about the supporting member 31 and causing the driven pulley 27 to move toward the driving pulley 26 by action of a spring 66 secured at one end to the mounting plate vertical leg 19 and at the other end to the arm 30. Thus, the pulley 27 will assume approximately the position as shown in dotted lines and allow the belt 28 to loosen and slip thereon. On the other hand, clutching of the driving pulley 26 and the driven pulley 27 is accomplished by pulling the handle 33 outwardly and downwardly to the position as shown in solid lines.

It will be understood that modifications and variations may be effected without departing from the scope of the novel concepts of the present invention, but it is understood that this application is to be limited only by the scope of the appended claims.

We claim as our invention:

1. In a mobile spraying unit having a spray tank, a pumping assembly for pumping fluid from said tank including an inverted L-shaped mounting plate secured to said tank, said plate including a horizontal leg paralleling the tank top and a vertical leg paralleling a tank side, a prime mover secured to said horizontal leg and having an output drive pulley, said pumping assembly including a pump having an inlet and an outlet adjustably carried by said vertical leg and having a driven pulley, a belt trained over said pulleys, an over-center toggle mechanism connected to said vertical leg and said pump for selectively positioning said pump and driven pulley thereby effecting a clutching and de-clutching action of said driven pulley, a conduit connecting the pump inlet to the tank, and a conduit leading from the pump outlet.

2. In combination with a mobile spray tank, a mounting plate at one end of said tank having a horizontal portion partially overlying the tank and a vertical portion extending downwardly from the outer end of said horizontal portion and along one side of said tank, a prime mover carried on said horizontal portion and having a rotary driving member extending away from the end of said tank, a swingable arm mounted in parallel spaced relation to said vertical portion, a driven member on said arm, means for driving and connecting said driving and driven members, a pump having an inlet and an outlet pivotally carried by said arm, a crank mounted on said arm in co-rotation with said driven member and being operatively connected to said pump, means for de-clutching said driving and driven members, a conduit connecting the pump inlet to the tank, and a conduit leading from the pump outlet.

3. In a mobile spraying unit having a spray tank, a pumping assembly for pumping fluid from said tank including an inverted L-shaped mounting plate secured to said tank, said plate including a horizontal leg paralleling the tank top and a vertical leg paralleling a tank side, a prime mover secured to said horizontal leg and having an outlet drive pulley, an arm pivoted on said vertical leg and in parallel spaced relationship thereto, a driven pulley rotatably mounted on said arm, said pumping assembly including a pump having an inlet and an outlet carried by said arm and being drivingly connected to said driven pulley, a belt trained over said pulley, means for moving the driven pulley toward and away from said drive pulley, said means comprising a lever pivotally connected at one end to said arm, a link pivotally connected at one end to the other end of said arm, said link being pivotally connected at an intermediate point to said vertical leg and having stop means for limiting relative movement in one direction with said lever, a conduit connecting the pump inlet to the tank, and a conduit leading from the pump outlet.

4. In a mobile spraying unit having a spray tank, a liquid agitating assembly for stirring the liquid in the tank including an inverted L-shaped mounting plate having a horizontal portion paralleling the tank top and being secured thereto and a vertical portion paralleling a tank side and being secured thereto, a prime mover carried on said horizontal portion and having a driving pulley, an over-center toggle mechanism on said vertical portion, a driving pulley carried by said mechanism, a belt trained over said pulleys, said mechanism being capable of moving said driven pulley towards and away from said driving pulley for controlling the power transmitting relationship between said pulleys, an agitating device pivotally carried on said mounting plate and extending into said tank, and a linkage arrangement connecting said driven pulley and said device to impart oscillating movement to the latter.

5. In a mobile spraying unit having a spray tank, a combination pumping and agitating apparatus for pumping liquid from said tank for distribution and for stirring the liquid in said tank, said apparatus being powered by a common driving arrangement, said arrangement including an inverted L-shaped mounting plate having a horizontal portion paralleling the tank top and being secured thereto and a vertical portion paralleling a tank side and being secured thereto, a prime mover carried on said horizontal portion and having a driving pulley, a supporting arm paralleling said vertical portion and being pivotally carried thereby at one end, a shaft rotatable in the other end of said arm and having a driven pulley connected thereto, a belt trained over said pulleys, means for selectively positioning the end of the arm remote from its pivot to effect disconnection between said driving and driven members, said pumping and agitating apparatus including a pump having an inlet and an outlet carried on said arm and being operatively connected to said shaft, an agitating device pivotally carried on said mounting plate and extending into said tank, said device being operatively connected to said shaft, a conduit connecting the pump inlet to the tank, and a conduit leading from the pump outlet.

6. In a mobile spraying unit having a spray tank, a combination pumping and agitating apparatus for pumping liquid from said tank for distribution and for stirring the liquid in said tank, said apparatus being powered by a common driving arrangement, this arrangement including an inverted L-shaped mounting plate having a horizontal portion paralleling the tank top and being secured thereto and a vertical portion paralleling a tank side and being secured thereto, a prime mover carried on said horizontal portion and having a driving pulley, a supporting arm paralleling said vertical portion and being pivotally carried thereby at one end, a shaft rotatable in the other end of said arm and having a driven pulley connected thereto, a belt trained over said pulleys, an over-center toggle mechanism mounted on said vertical portion and being connected to said arm so that actuation of said mechanism swings the arm to move the driven pulley towards and away from said driving pulley, a crank carried on said shaft, said pumping and agitating apparatus including a reciprocating piston pump pivotally mounted at one end to the arm and having a piston at the other end, said pump having an inlet and an outlet, a crank pin carried by said crank and rotatably engaging said pump piston, an agitator comprising a paddle in said tank, a rock shaft carried by said mounting plate and being adjustably connected to said paddle, linkage operatively connecting said crank pin and rock shaft, whereby reciprocation of the pump piston and oscillation of said paddle is simultaneously effected, a conduit connecting the pump inlet to the tank, and a conduit leading from the pump outlet.

7. In a travelling spraying unit, a carriage equipped with means to travel over the ground, a tank on said carriage, a propelling connection at one end of said tank, a prime mover on top of said tank adjacent said end, a pump having an inlet and an outlet mounted over said tank end externally of the tank, drive means connecting said pump and prime mover, a pendulum-like agitator in said tank, a pitman connected to said pump, drive linkage between said pitman and said agitator, manually operable means on said tank end to bodily move said pump for clutching and de-clutching said drive means, a conduit connecting the pump inlet to the tank, and a conduit leading from the pump outlet.

8. In a travelling spraying unit, a carriage equipped with means to travel over the ground, a tank on said carriage, a propelling connection at one end of said tank, a prime mover on top of said tank adjacent said end, a pump having an inlet and an outlet mounted over said tank end externally of the tank, drive means connecting said pump and prime mover, a pendulum-like agitator in said tank, a pitman connected to said pump, drive linkage between said pitman and said agitator, and manually operable means on said tank end to bodily move said pump for clutching and de-clutching said drive means, an adjustable connection between the agitator and said linkage to selectively vary the effective angular position of the agitator, a conduit connecting the pump inlet to the tank, and a conduit leading from the pump outlet.

References Cited in the file of this patent

UNITED STATES PATENTS

| | | |
|---|---|---|
| 569,718 | Kennedy et al. | Oct. 20, 1896 |
| 2,239,777 | Calkins | Apr. 29, 1941 |
| 2,458,767 | Cooper | Jan. 11, 1949 |
| 2,559,980 | McAllister | July 10, 1951 |
| 2,627,438 | McNair | Feb. 3, 1953 |